United States Patent
Miyata

(10) Patent No.: US 9,712,708 B2
(45) Date of Patent: Jul. 18, 2017

(54) HUMAN-BODY DETECTING DEVICE, IMAGE FORMING APPARATUS, HUMAN-BODY DETECTING METHOD, AND COMPUTER PROGRAM PRODUCT

(71) Applicant: Yushi Miyata, Tokyo (JP)

(72) Inventor: Yushi Miyata, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/070,543

(22) Filed: Mar. 15, 2016

(65) Prior Publication Data

US 2016/0277620 A1  Sep. 22, 2016

(30) Foreign Application Priority Data

Mar. 19, 2015 (JP) .................................. 2015-057004

(51) Int. Cl.
| | | |
|---|---|---|
| *G06F 15/00* | (2006.01) | |
| *G06F 3/12* | (2006.01) | |
| *G06K 1/00* | (2006.01) | |
| *H04N 1/00* | (2006.01) | |

(52) U.S. Cl.
CPC . *H04N 1/00896* (2013.01); *H04N 2201/0094* (2013.01)

(58) Field of Classification Search
CPC ....... H04N 1/00896; H04N 2201/0094; G06K 15/02; G06F 3/1297

USPC ........................................ 358/1.1, 1.13, 1.15
See application file for complete search history.

(56) References Cited

U.S. PATENT DOCUMENTS

| | | | |
|---|---|---|---|
| 2007/0127046 A1 | 6/2007 | Soeda | |
| 2015/0378294 A1* | 12/2015 | Haraguchi | ......... G03G 15/5004 399/75 |
| 2015/0378296 A1* | 12/2015 | Kim | ................... G03G 15/5091 399/80 |
| 2016/0021272 A1* | 1/2016 | Utsunomiya | ........ G06K 15/406 358/1.13 |
| 2016/0124496 A1* | 5/2016 | Horishita | .............. G06F 1/3231 713/323 |

FOREIGN PATENT DOCUMENTS

JP    2007-158663    6/2007

* cited by examiner

*Primary Examiner* — Douglas Tran
(74) *Attorney, Agent, or Firm* — Oblon, McClelland, Maier & Neustadt, L.L.P.

(57) ABSTRACT

A human-body detecting device includes a first sensor and a control unit. The first sensor outputs a first signal according to a distance between the human-body detecting device and a user. The control unit finds a first weighted average of first signals weighted with a first weight and a second weighted average of the first signals weighted with a second weight different from the first weight, and detects, when a difference between the first weighted average and the second weighted average has exceeded a predetermined value, that the user is located within a predetermined range from the human-body detecting device.

8 Claims, 6 Drawing Sheets

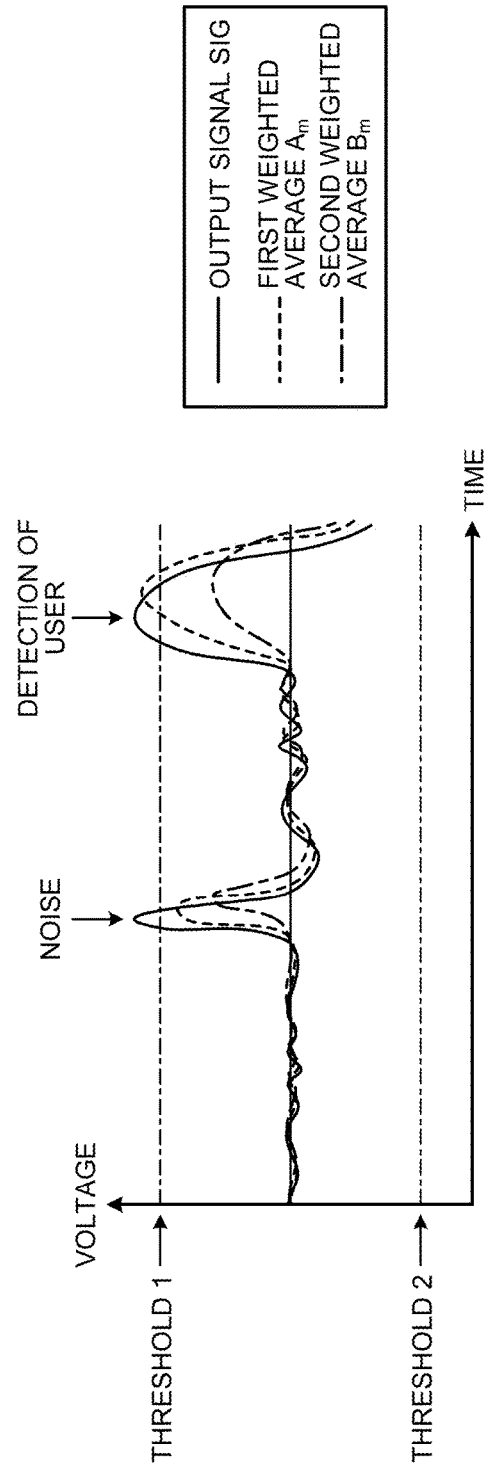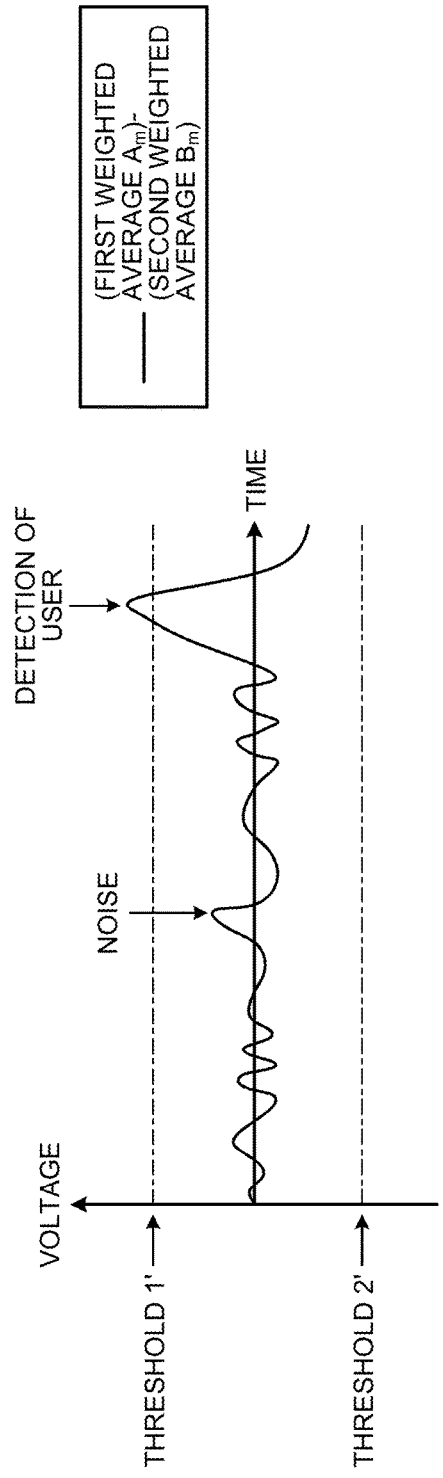

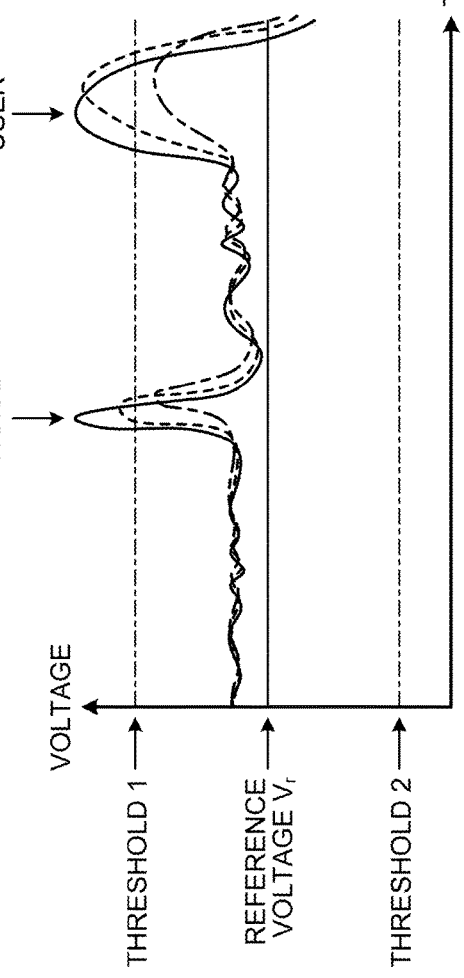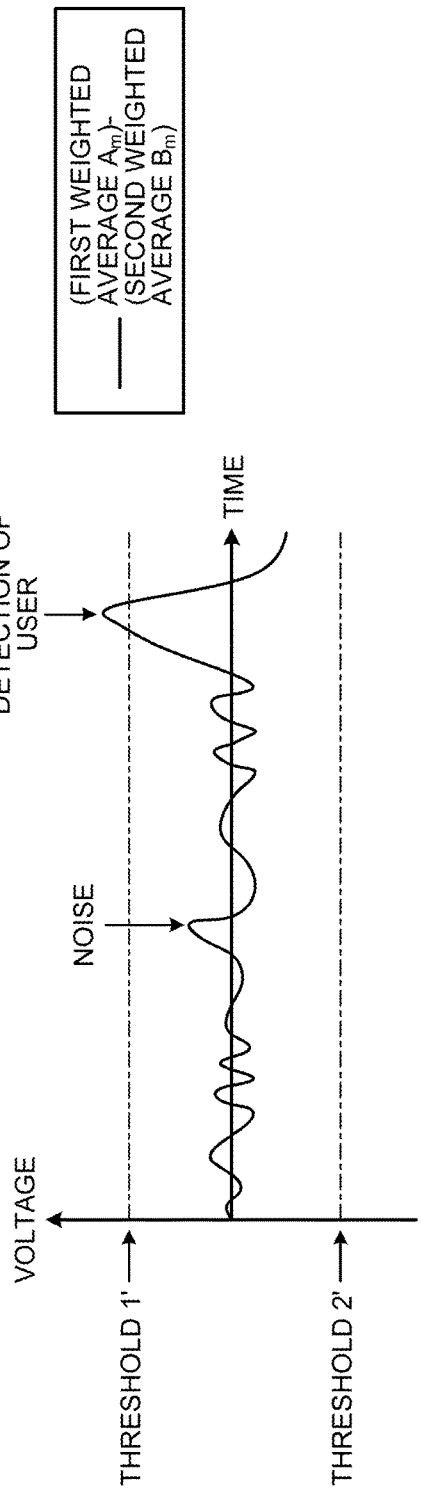

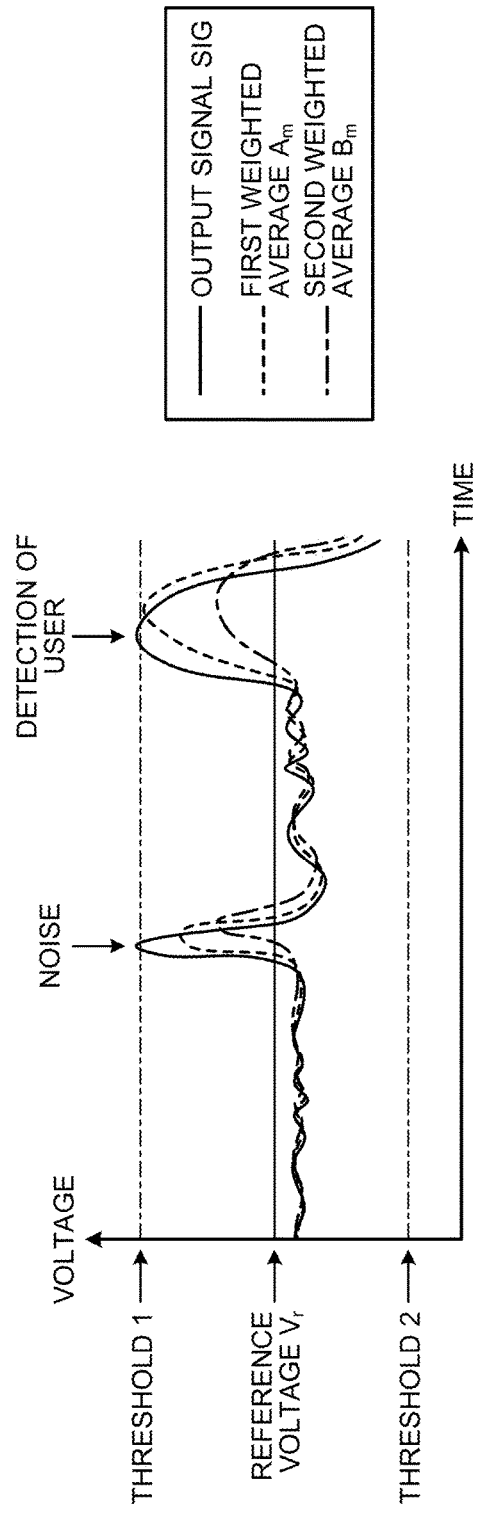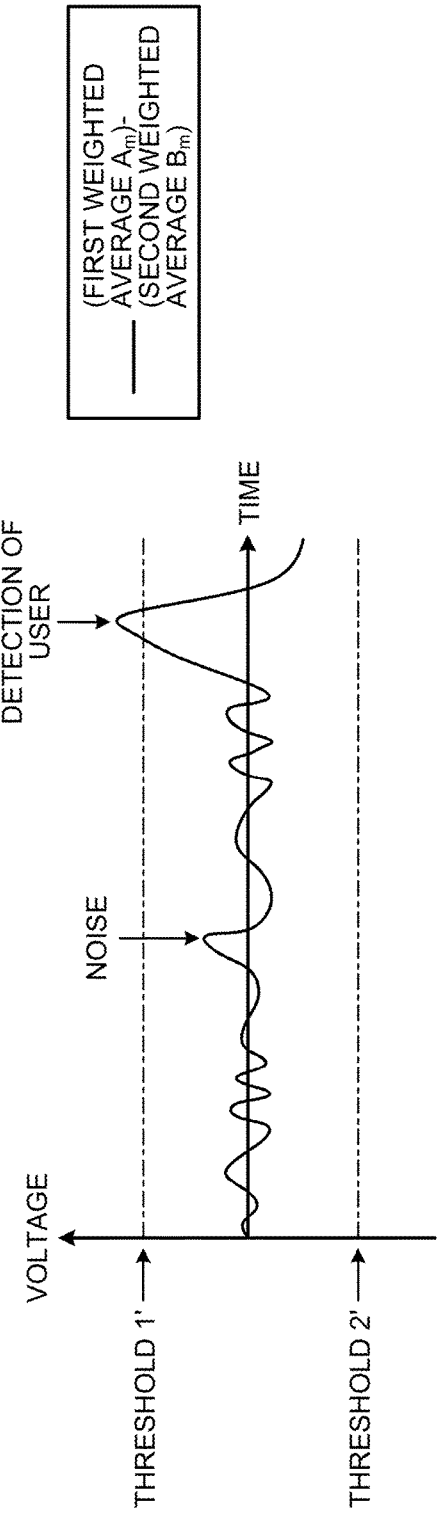

HUMAN-BODY DETECTING DEVICE, IMAGE FORMING APPARATUS, HUMAN-BODY DETECTING METHOD, AND COMPUTER PROGRAM PRODUCT

CROSS-REFERENCE TO RELATED APPLICATIONS

The present application claims priority to and incorporates by reference the entire contents of Japanese Patent Application No. 2015-057004 filed in Japan on Mar. 19, 2015.

BACKGROUND OF THE INVENTION

1. Field of the Invention

The present invention relates to a human-body detecting device, an image forming apparatus, a human-body detecting method, and a computer program product.

2. Description of the Related Art

An image forming apparatus such as a multi-function peripheral (MFP) is provided with a system that detects the approach of a user to the image forming apparatus by using a human-body detection sensor and causes the image forming apparatus to return from an energy-saving mode in advance of the user's arrival, thereby reducing the user's waiting time when using the image forming apparatus.

SUMMARY OF THE INVENTION

According to exemplary embodiments of the present invention, there is provided a human-body detecting device comprising: a first sensor that outputs a first signal according to a distance between the human-body detecting device and a user; and a control unit that finds a first weighted average of first signals weighted with a first weight and a second weighted average of the first signals weighted with a second weight different from the first weight, and detects, when a difference between the first weighted average and the second weighted average has exceeded a predetermined value, that the user is located within a predetermined range from the human-body detecting device.

Exemplary embodiments of the present invention also provide an image forming apparatus comprising the above-described human-body detecting device, wherein when the human-body detecting device has detected that a user is located within a predetermined range from the image forming apparatus, the control unit causes the image forming apparatus to return from an energy-saving mode.

Exemplary embodiments of the present invention also provide a human-body detecting method comprising: finding a first weighted average of first signals weighted with a first weight and a second weighted average of the first signals weighted with a second weight different from the first weight, the first signals being output from a first sensor according to a distance between a human-body detecting device and a user; and detecting, when a difference between the first weighted average and the second weighted average has exceeded a predetermined value, that the user is located within a predetermined range from the human-body detecting device.

Exemplary embodiments of the present invention also provide a computer program product comprising a non-transitory computer-readable recording medium having a computer program causing a computer to serve as a control unit that executes: finding a first weighted average of first signals weighted with a first weight and a second weighted average of the first signals weighted with a second weight different from the first weight, the first signals being output from a first sensor according to a distance between a human-body detecting device and a user; and detecting, when a difference between the first weighted average and the second weighted average has exceeded a predetermined value, that the user is located within a predetermined range from the human-body detecting device.

The above and other objects, features, advantages and technical and industrial significance of this invention will be better understood by reading the following detailed description of presently preferred embodiments of invention, when considered in connection with the accompanying drawings.

BRIEF DESCRIPTION OF THE DRAWINGS

FIGS. 4A and 4B are diagrams for explaining a process of detecting the approach of a user to the NFP according to the embodiment;

FIGS. 5A and 5B are diagrams for explaining a process of detecting the approach of a user to the MFP according to the embodiment; and FIGS. 6A and 6B are diagrams for explaining a process of detecting the approach of a user to the MFP according to the embodiment.

DETAILED DESCRIPTION OF THE PREFERRED EMBODIMENTS

An exemplary embodiments of a human-body detecting device, an image forming apparatus, a human-body detecting method, and a computer program product according to the present invention will be described in detail below with reference to accompanying drawings. In the following description, there is described an example in which the human-body detecting device, image forming apparatus, human-body detecting method, and computer program product according to the present embodiment are applied to a multi-function peripheral (MFP).

Figure 1:
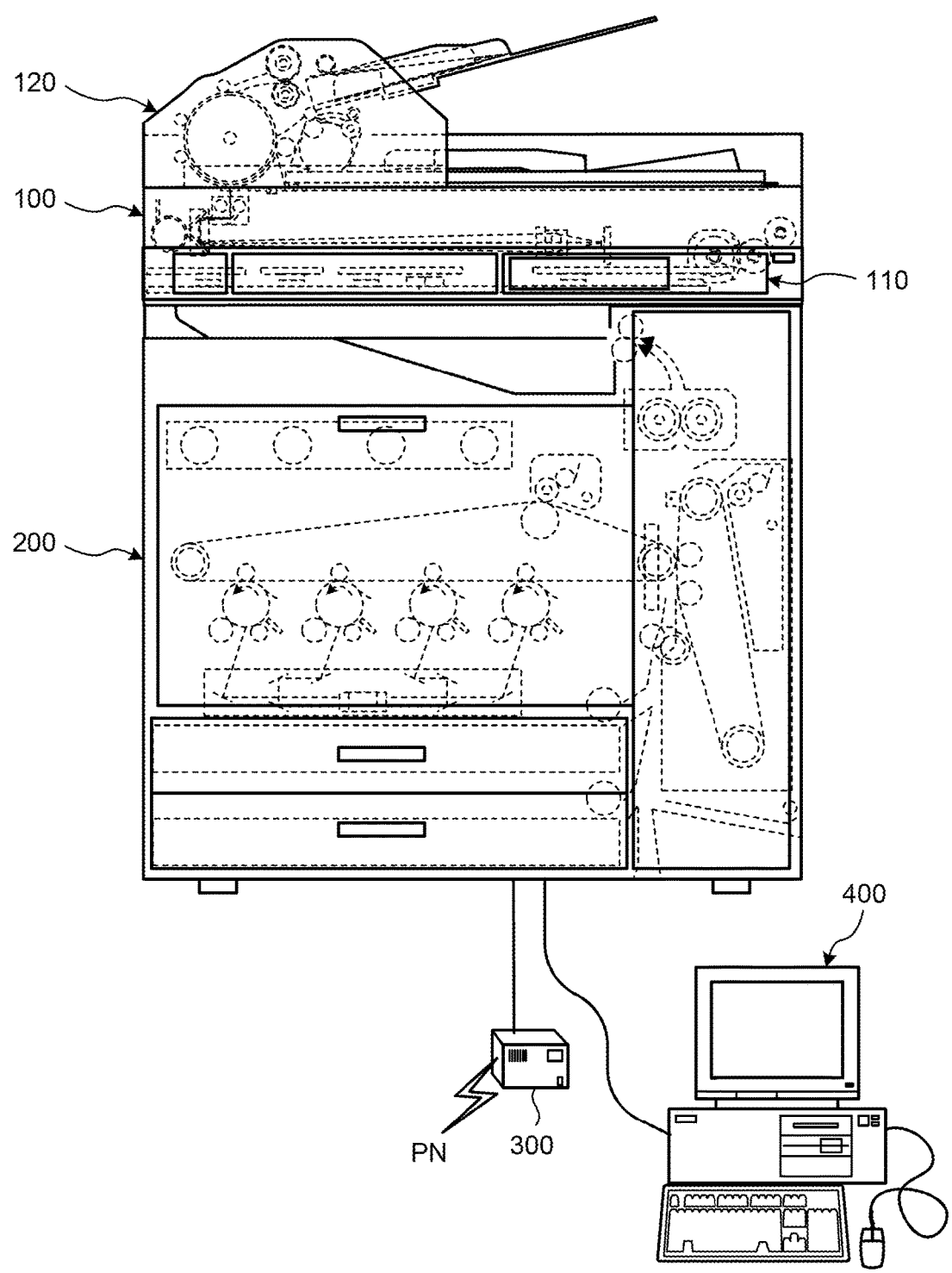
FIG. 1 is a schematic diagram showing an example of an NFP according to an embodiment of the present invention.

FIG. 1 is a schematic diagram showing an example of an MFP according to the present embodiment. As shown in FIG. 1, the MFP according to the present embodiment broadly includes an auto document feeder (ADF) 120, an operation unit 110, a scanner 100, a printer 200, etc. The operation unit 110 and the scanner 100 are units that can be separated from the printer 200. The scanner 100 includes a system control unit 20 (see FIG. 3) including drivers for devices, a sensor, a controller, etc. The system control unit 20 performs communication with an engine control unit 23 (see FIG. 3) included in the printer 200, and controls and causes the scanner 100 to read an original at the timing directed by the engine control unit 23.

In the present embodiment, the MFP performs communication with an external device connected via a public network through a private branch exchange (PBX) 300, and performs, for example, printing of image data received from the external device. Furthermore, the MFP performs communication with a host PC 400 connected via a network such as a local area network (LAN), and performs, for example, printing of image data received from the host PC 400.

Figure 2:
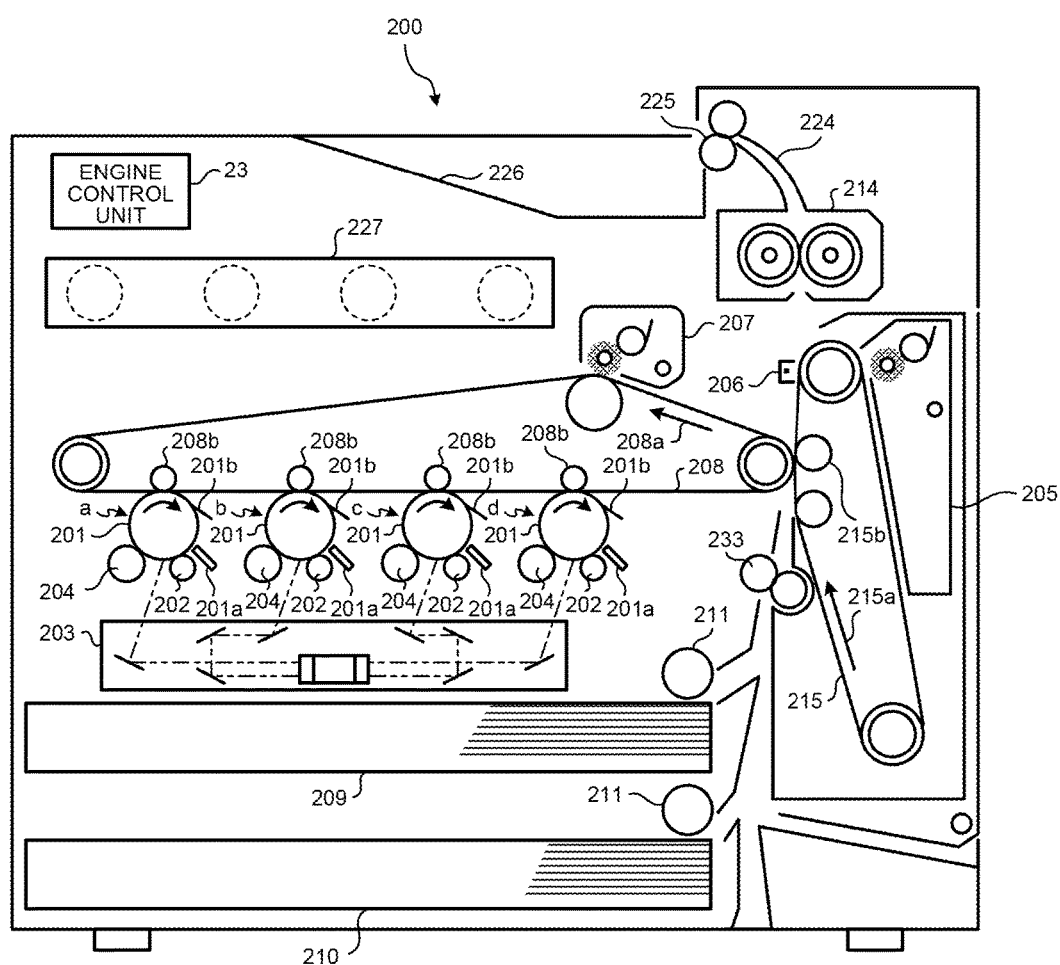
FIG. 2 is a schematic diagram showing an example of a printer included in the MFP according to the embodiment.

FIG. 2 is a schematic diagram showing an example of the printer included in the MFP according to the present embodiment. As shown in FIG. 2, the printer 200 according to the present embodiment is a laser printer capable of forming a color image. The printer 200 includes four toner-image forming units a, b, c, and d that form magenta (M), cyan (C), yellow (Y), and black (K)-color images, respectively; the toner-image forming units a, b, c, and d are arranged along a moving direction (a direction indicated by an arrow 208a) of a first transfer belt 208. That is, the printer 200 according to the present embodiment is a 4-drum type (tandem system) full-color image forming apparatus.

The printer 200 includes photoconductors 201 which are rotatably supported so as to be able to rotate in the direction indicated by the arrow shown in FIG. 2. A static eliminator 201a, a cleaning device 201b, a charging device 202, and a developing device 204 are placed around each of the photoconductors 201. The static eliminator 201a eliminates static electricity from the surface of the photoconductor 201. The cleaning device 201b removes toner remaining on the surface of the photoconductor 201. The charging device 202 uniformly charges the surface of the photoconductor 201. The developing device 204 develops an electrostatic latent image formed on the surface of the photoconductor 201 into a toner image. A gap is secured between the charging device 202 and the developing device 204; a light that an exposure device 203 exposes the surface of the photoconductor 201 thereto passes through the gap. The four toner-image forming units a, b, c, and d are each provided with the photoconductor 201. The same components for image formation (for example, the static eliminator 201a, the cleaning device 201b, the charging device 202, and the developing device 204) are placed around the respective photoconductors 201 of the toner-image forming units a, b, c, and d. The respective developing devices 204 included in the four toner-image forming units a, b, c, and d differ in color of a developed toner image (toner).

The photoconductor 201 is partly in contact with the first transfer belt 208. In the present embodiment, the four toner-image forming units a, b, c, and d each include the drum-shaped photoconductor 201; however, the shape of the photoconductor 201 is not limited to this, and can be belt-shaped one. The first transfer belt 208 is stretched over a support roller and a drive roller, and can move in the direction of the arrow 208a. Inside a loop-like moving path of the first transfer belt 208, four first transfer rollers 208b are placed to transfer toner images formed on the photoconductors 201 onto the first transfer belt 208, respectively. Each first transfer roller 208b is placed near the photoconductor 201. Furthermore, outside the loop-like moving path of the first transfer belt 208, a cleaning device 207 is placed.

The cleaning device 207 removes unnecessary toner remaining on the first transfer belt 208 after a toner image transferred onto the first transfer belt 208 has been transferred onto a transfer sheet P or a secondary transfer belt 215. The exposure device 203 includes a light-emitting diode (LED) array and an imaging means, and irradiates the surfaces of the photoconductors 201 with light using a known laser system, thereby forming electrostatic latent images corresponding to a color image on the photoconductors 201, respectively.

The printer 200 is provided with the secondary transfer belt 215 on the right side of the first transfer belt 208 in FIG. 2. The secondary transfer belt 215 is in contact with the first transfer belt 208 and forms a transfer nip at which a toner image on the first transfer belt 208 is transferred onto a transfer sheet P. The secondary transfer belt 215 is stretched over a support roller and a drive roller, and can move in a direction of an arrow 215a. Inside a loop-like moving path of the secondary transfer belt 215, a secondary transfer unit 215b is placed to transfer a toner image formed on the first transfer belt 208 onto a transfer sheet P or the secondary transfer belt 215.

Furthermore, outside the secondary transfer belt 215, a cleaning device 205, a charger 206, etc. for the secondary transfer belt 215 are placed. The cleaning device 205 removes unnecessary toner remaining on the secondary transfer belt 215 after a toner image on the first transfer belt 208 or the secondary transfer belt 215 has been transferred onto a transfer sheet P. The charger 206 transfers a toner image formed on the secondary transfer belt 215 onto a transfer sheet P.

Sheet cassettes 209 and 210 contain transfer sheets P. The transfer sheets P contained in the sheet cassette 209 or 210 are conveyed to a registration roller 233 through a plurality of sheet guides one by one from the top of the sheets P by a sheet feeding roller 211. Above the secondary transfer belt 215, a fixing device 214, a sheet ejection guide 224, a sheet ejection roller 225, a sheet ejection stack 226, etc. are placed. The fixing device 214 fixes a toner image transferred onto a transfer sheet P. The sheet ejection guide 224 guides the transfer sheet P to the sheet ejection stack 226. The sheet ejection roller 225 ejects the transfer sheet P with the toner image fixed thereon into the sheet ejection stack 226. The sheet ejection stack 226 is where the transfer sheet P ejected by the sheet ejection roller 225 is put. Furthermore, a storage unit 227 in which refill toner can be stored is placed above the secondary transfer belt 215 and below the sheet ejection stack 226.

In the storage unit 227, cartridges containing magenta (M), cyan (C), yellow (Y), and black (K) toner, respectively, are stored. Then, the toner stored in the storage unit 227 is appropriately supplied to corresponding developing device 204 by a powder pump or the like.

Subsequently, a process of duplex printing performed by the printer 200 according to the present embodiment is explained with FIG. 2. First, the printer 200 controls the toner-image forming unit a and forms a toner image on first transfer belt 208. Specifically, the exposure device 203 irradiates the surface of the photoconductor 201, which has been uniformly charged by the charging device 202, with light from an LED light source (not shown) through optical components (not shown). Accordingly, the exposure device 203 forms an electrostatic latent image corresponding to a color image to be printed on the surface of the photoconductor 201.

The electrostatic latent image formed on the surface of the photoconductor 201 is developed by the developing device 204. That is, a toner image is formed on the surface of the photoconductor 201. The toner image formed on the surface of the photoconductor 201 is transferred onto the surface of the first transfer belt 208 by the first transfer roller 208b. After the toner image has been transferred onto the first transfer belt 208, toner remaining on the surface of the photoconductor 201 is removed by the cleaning device 201b, and static electricity on the surface of the photoconductor 201 is eliminated by the static eliminator 201a so that the photoconductor 201 is ready for the next image formation.

The first transfer belt 208 moves in the direction of the arrow 208a, carrying the toner image transferred on the surface thereof. Next, the printer 200 controls the toner-image forming unit b and forms a different color toner image on the first transfer belt 208. This image is superimposed on the already-formed toner image on the first transfer belt 208. The printer 200 repeats the above process with respect to all the toner-image forming units a, b, c, and d and forms a color image of four color toner images superimposed one another on the first transfer belt 208. In the present embodiment, there is described an example of forming a color image of four color toner images superimposed one another on the first transfer belt 208; however, not limited to this, the printer 200 can also form only one color toner image (for example, a K-toner image) on the first transfer belt 208.

The secondary transfer belt 215 moves in the direction indicated by the arrow 215a in synchronization with the first transfer belt 208, and the color image formed on the first transfer belt 208 is transferred onto the secondary transfer belt 215 by the secondary transfer unit 215b. In the present embodiment, while forming toner images on the photoconductors 201 of the four toner-image forming units a, b, c, and d, the printer 200 moves the first transfer belt 208 and the secondary transfer belt 215 and transfers a toner image onto the secondary transfer belt 215; therefore, it is possible to reduce the time taken to transfer a toner image onto the secondary transfer belt 215.

After completion of the transfer of the toner image onto the secondary transfer belt 215, when the first transfer belt 208 has moved to a predetermined position, a toner image to be transferred onto the other side of a transfer sheet P is formed on the first transfer belt 208 in the same way as the above. Then, the printer 200 controls the sheet feeding roller 211 to pick up a transfer sheet P one by one from the sheet cassette 209 or 210 and convey the transfer sheet P to the registration roller 233. The printer 200 feeds the transfer sheet P to between the first transfer belt 208 and the secondary transfer belt 215 through the registration roller 233, and the toner image formed on the first transfer belt 208 is transferred onto one side of the transfer sheet P by the secondary transfer unit 215b. After that, the printer 200 conveys the transfer sheet P in the direction indicated by the arrow 215a, and the toner image formed on the secondary transfer belt 215 is transferred onto the other side of the transfer sheet P by the charger 206. When transferring a toner image onto a transfer sheet P, the printer 200 adjusts the timing to convey the transfer sheet P so that the transfer position of the toner image on the transfer sheet P becomes the position set in advance.

The transfer sheet P with the toner images formed on both sides thereof through the above process is conveyed to the fixing device 214. The printer 200 causes the fixing device 214 to fix the toner images formed on both sides of the transfer sheet P at a time, and the transfer sheet P passes through the sheet ejection guide 224 and is ejected into the sheet ejection stack 226 located on top of a main body frame of the printer 200 by the sheet ejection roller 225.

As shown in FIG. 2, when images are printed on both sides of a transfer sheet P through the above process, the transfer sheet P is put on the sheet ejection stack 226 so that out of the two sides of the transfer sheet P, the side onto which a toner image is transferred directly from the first transfer belt 208 is the underside. Therefore, to put printouts on the sheet ejection stack 226 so as to be collated by page, a toner image for the second page is transferred onto the secondary transfer belt 215, and then a toner image for the first page is directly transferred from the first transfer belt 208 onto a transfer sheet P. At this time, as for a toner image to be directly transferred from the first transfer belt 208 onto a transfer sheet P, the printer 200 forms the toner image on a photoconductor 201 so as to be a normal image on the photoconductor 201. On the other hand, as for a toner image to be transferred from the secondary transfer belt 215 onto the transfer sheet P, the printer 200 forms the toner image on a photoconductor 201 so as to be a reverse image (a mirror image) on the photoconductor 201.

A process of deciding the order in which toner images are formed to put transfer sheets P on the sheet ejection stack 226 so as to be collated by page and a process of switching a toner image to be formed on the photoconductor 201 to either a normal image or a reverse image are performed in the expansion of image data into a memory of the engine control unit 23.

After the toner image has been transferred from the secondary transfer belt 215 onto the transfer sheet P, the printer 200 causes the cleaning device 205 equipped with a brush roller 205a, a collection roller 205b, a blade 205c, etc. to remove toner and paper dust which remain on the secondary transfer belt 215. In FIG. 2, the brush roller 205a is in a state of being separated from the secondary transfer belt 215; however, the brush roller 205a is configured to be able to come in contact with the surface of the secondary transfer belt 215. Specifically, in a state where the secondary transfer belt 215 carries a toner image thereon, the brush roller 205a is separated from the secondary transfer belt 215; after the toner image has been transferred from the secondary transfer belt 215 onto a transfer sheet P, the brush roller 205a comes in contact with the secondary transfer belt 215 and removes toner remaining on the secondary transfer belt 215. Duplex printing on a transfer sheet P is performed through the above process.

Subsequently, a process of simplex printing by printer 200 according to the present embodiment is explained with FIG. 2. The printer 200 according to the present embodiment has a first simplex printing mode and a second simplex printing mode. In the first simplex printing mode, simplex printing is performed with the secondary transfer belt 215; in the second simplex printing mode, simplex printing is performed with the first transfer belt 208. When printing on a transfer sheet P is performed in the first simplex printing mode, the printer 200 transfers a toner image formed on the first transfer belt 208 onto the secondary transfer belt 215, and further transfers the toner image formed on the secondary transfer belt 215 onto one side of the transfer sheet P. After that, the printer 200 ejects the transfer sheet P into the sheet ejection stack 226 without performing the transfer of a toner image onto the other side of the transfer sheet P. In this case, the top side of the transfer sheet P ejected into the sheet ejection stack 226 is the side with the image printed thereon.

On the other hand, when printing on a transfer sheet P is performed in the second simplex printing mode, the printer 200 transfers a toner image formed on the first transfer belt 208 onto one side of the transfer sheet P. After that, the printer 200 ejects the transfer sheet P into the sheet ejection stack 226 without performing the transfer of a toner image onto the other side of the transfer sheet P. In this case, the underside of the transfer sheet P ejected into the sheet ejection stack 226 is the side with the image printed thereon.

Figure 3:
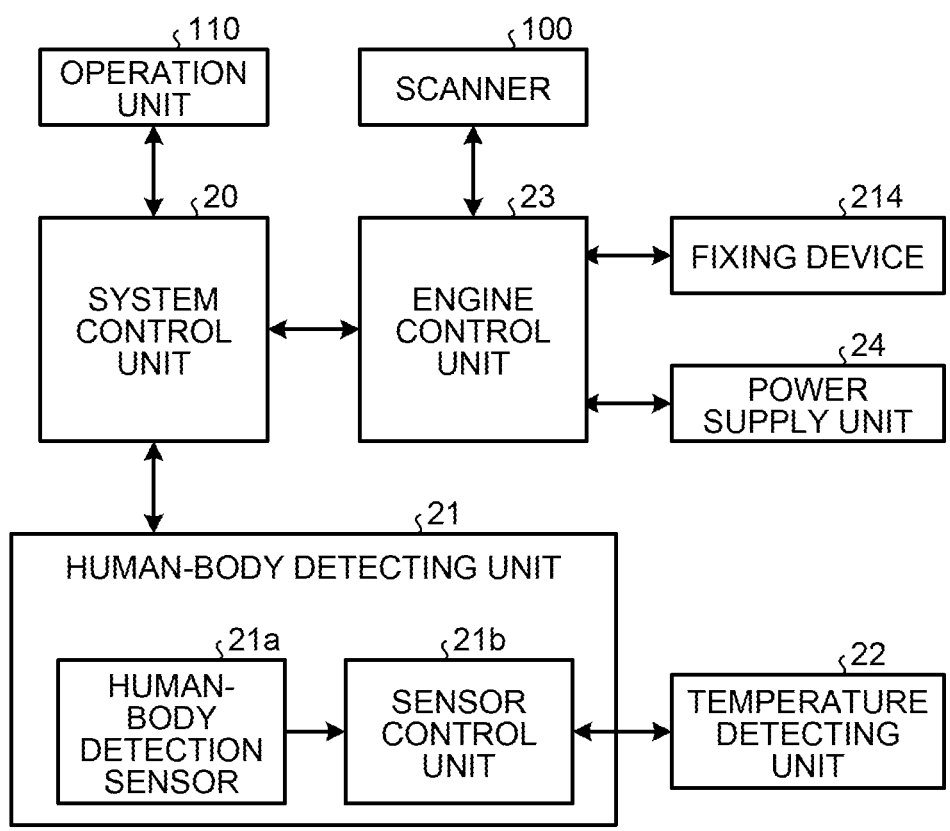
FIG. 3 is a block diagram showing an example of a functional configuration of the MFP according to the embodiment.

Subsequently, a functional configuration of the MFP according to the present embodiment is explained with FIG. 3. FIG. 3 is a block diagram showing an example of the functional configuration of the MFP according to the present embodiment.

As shown in FIG. 3, the MFP according to the present embodiment includes the system control unit 20, a human-body detecting unit 21, a temperature detecting unit 22, the engine control unit 23, a power supply unit 24, scanner 100, the operation unit 110, and the fixing device 214. The operation unit 110 is a user interface for a user to operate the MFP. The operation unit 110 displays information necessary for operation of the MFP on a display unit (not shown), and transmits operation information input by the user to the system control unit 20.

The scanner 100 optically reads an original, and transmits image data of the read original to the system control unit 20 through the engine control unit 23. The fixing device 214 is, as described above, a device that fixes a toner image transferred onto a transfer sheet P on the transfer sheet P. The power supply unit 24 supplies each unit in the MFP with power necessary for driving the unit. In the present embodiment, the power supply unit 24 converts voltage input from a commercial power supply into voltage necessary in the MFP and applied the converted voltage to each unit in the MFP.

The system control unit 20 and the engine control unit 23 control the entire MFP. Specifically, the system control unit 20 and the engine control unit 23 control the scanner 100, the fixing device 214, etc. sequentially according to operating mode of the MFP. Furthermore, when the MFP is set in, out of modes that the MFP has, an energy-saving mode in which power consumption is low, the system control unit 20 controls so that only some of function units (for example, a network function unit) included in the system control unit 20 and the human-body detecting unit 21 are supplied with power. The modes that the MFP has include a standby mode, an operating mode, etc. besides the energy-saving mode.

In the present embodiment, when the human-body detecting unit 21 to be described below has detected that a user is located within a predetermined range from the MFP, the system control unit 20 (an example of a control unit) causes the MFP to return from the energy-saving mode. Accordingly, when a user uses the MFP, the user does not have to perform an operation to return the MFP from energy-saving mode through the operation unit 110; therefore, it is possible to improve the convenience of the MFP.

The human-body detecting unit 21 detects the approach of a user to the MFP. The human-body detecting unit 21 includes a human-body detection sensor 21*a* and a sensor control unit 21*b*. The human-body detection sensor 21*a* (an example of a first sensor) outputs an output signal SIG (an example of a first signal) according to the distance between the MFP and the user. The human-body detection sensor 21*a* is composed of, for example, an infrared sensor, and outputs an electrical signal (an output signal SIG) of voltage according to the distance between the MFP and the user.

The sensor control unit 21*b* (an example of a control unit) outputs a result of detection of whether a user is located within a predetermined range from the MFP on the basis of a signal level (voltage) of an output signal SIG output from the human-body detection sensor 21*a*.

Specifically, the sensor control unit 21*b* finds a first weighted average A of output signals SIG weighted with a first weight $n_1$ and a second weighted average B of the output signals SIG weighted with a second weight $n_2$ greater than the first weight $n_1$. In the present embodiment, the second weight $n_2$ is a value greater than the first weight $n_1$; however, a value of the second weight $n_2$ is not limited to this, and can be any value as long as the second weight $n_2$ has a different value from the first weight $n_1$.

Then, when a difference between a first weighted average A and a second weighted average B has exceeded a threshold 1' (an example of a predetermined value), the sensor control unit 21*b* detects that a user is located within the predetermined range from the MFP. Accordingly, it is possible to detect a user approaching the MFP without taking into account an offset included in an output signal SIG; therefore, even when an offset is included in an output signal SIG, the approach of a user to the MFP can be detected in a short time. Incidentally, the threshold 1' is a value set in advance. In the present embodiment, the sensor control unit 21*b* changes the threshold 1' according to operation information (an example of a second signal) input from the operation unit 110 (an example of an input unit).

The temperature detecting unit 22 (an example of a second sensor) detects ambient temperature of the MFP, and notifies the sensor control unit 21*b* of temperature information indicating the detected temperature. Then, if the temperature indicated by the temperature information notified by the temperature detecting unit 22 exceeds a predetermined temperature, the sensor control unit 21*b* invalidates a result of user detection using output signals SIG. The predetermined temperature here is a temperature that an output signal SIG output from the human-body detection sensor 21*a* is affected thereby, and shall be set in advance. When an infrared sensor is used as the human-body detection sensor 21*a*, if the ambient temperature of the MFP is high, this affects an output signal SIG and therefore decreases the accuracy of detecting the approach of a user to the MFP. This may cause an incorrect operation of the MFP, such as return from the energy-saving mode, even though no user approaches the MFP. Meanwhile, in the present embodiment, when the temperature detected by the temperature detecting unit 22 exceeds the predetermined temperature, the sensor control unit 21*b* invalidates a result of user detection using output signals SIG (i.e., determines that no user is located within the predetermined range from the MFP). Accordingly, if the ambient temperature of the MFP increases, the temperature increase is not falsely detected as due to the approach of a user to the MFP; therefore, it is possible to prevent the MFP from unnecessarily returning from the energy-saving mode.

Subsequently, a process of detecting the approach of a user to the MFP is explained with FIGS. 4A and 4B. FIGS. 4A and 4B are diagrams for explaining the process of detecting the approach of a user to the MFP according to the present embodiment. FIG. 4A is a diagram showing a signal level (voltage) of an output signal SIG output from the human-body detection sensor 21*a*, a first weighted average A of output signals SIG, and a second weighted average B of the output signals SIG. FIG. 4B is a diagram showing a value obtained by subtracting the second weighted average B from the first weighted average A (i.e., a difference voltage D which is a difference between the first weighted average A and the second weighted average B). In FIGS. 4A and 4B, the vertical axis indicates voltage, and the horizontal axis indicates time.

The sensor control unit 21*b* acquires output signals SIG output from the human-body detection sensor 21*a* at intervals of a time set in advance. Then, as shown in FIG. 4A, the sensor control unit 21*b* calculates a first weighted average $A_m$ of the acquired output signals SIG weighted with the first weight $n_1$ (an example of a first weighted average) and a second weighted average $B_m$ of the output signals SIG weighted with the second weight $n_2$ greater than the first weight $n_1$ (an example of a second weighted average). In the present embodiment, the sensor control unit 21*b* calculates the first weighted average $A_m$ and the second weighted average $B_m$ using the following Equations (1) and (2).

$$A_m = 1/n_1 * SIG + (n_1-1)/n_1 * A_{m-1} \qquad (1)$$

Here, $A_{m-1}$ denotes the previous first weighted average calculated before $A_m$.

$$B_m = 1/n_2 * SIG + (n_2-1)/n_2 * B_{m-1} \quad (2)$$

Here, $B_{m-1}$ denotes the previous second weighted average calculated before $B_m$.

The first weight $n_1$ is preferably set so that noise contained in output signals SIG (see FIG. 4A) can be eliminated (i.e., a signal level of an output signal SIG with noise superimposed becomes lower than the threshold 1') and a waveform of first weighted average A is similar to that of output signal SIG. Furthermore, the second weight $n_2$ is preferably set so that when a second weighted average B is subtracted from a first weighted average A, an offset included in an output signal SIG is cancelled and a waveform of second weighted average B similar to that of output signal SIG.

Here, if whether a user has approached the MFP or not is detected by whether a signal level (voltage) of an output signal SIG shown in FIG. 4A has exceeded a threshold 1 or not, when a signal level of an output signal SIG has exceeded the threshold 1 due to noise, the sensor control unit 21b also detects it as the approach of a user to the MFP.

Therefore, the sensor control unit 21b finds a difference voltage D shown in FIG. 4B by subtracting a second weighted average $B_m$ calculated using Equation (2) from a first weighted average $A_m$ calculated using Equation (1). Then, as shown in FIG. 4B, when the difference voltage D has exceeded the threshold 1', the sensor control unit 21b detects the approach of a user to the MFP. This prevents a difference voltage D from exceeding the threshold 1' due to noise; therefore, it is possible to prevent false detection of the approach of a user to the MFP when noise is mixed into an output signal SIG.

Subsequently, a process of detecting the approach of a user to the MFP when an output signal SIG includes an offset in a positive direction with respect to a reference voltage $V_r$ is explained with FIGS. 5A and 5B. FIGS. 5A and 5B are diagrams for explaining the process of detecting the approach of a user to the MFP according to the present embodiment. FIG. 5A is a diagram showing a signal level (voltage) of an output signal SIG including an offset, a first weighted average A of output signals SIG including the offset, and a second weighted average B of the output signals SIG including the offset. FIG. 5B is a diagram showing a value obtained by subtracting the second weighted average B from the first weighted average A (i.e., a difference between the first weighted average A and the second weighted average B). In FIGS. 5A and 5B, the vertical axis indicates voltage, and the horizontal axis indicates time.

In a case where output signals SIG include an offset in the positive direction with respect to the reference voltage $V_r$, as shown in FIG. 5A, if whether a user has approached the MFP or not is detected by whether an output signal SIG or a first weighted average $A_m$ has exceeded the threshold 1 or not, when an output signal SIG or a first weighted average $A_m$ has exceeded the threshold 1 due to noise, it is also detected as the approach of a user to the MFP. The reference voltage $V_r$ here is a signal level (voltage) of an output signal SIG output from the human-body detection sensor 21a when not performing the user detection.

Therefore, when a difference voltage D shown in FIG. 5B has exceeded the threshold 1', the sensor control unit 21b detects the approach of a user to the MFP. Accordingly, the approach of a user to the MFP can be detected by using a difference voltage D reduced in the influence of an offset included in output signals SIG; therefore, it is possible to prevent false detection of the approach of a user to the MFP when an offset is included in an output signal SIG. Furthermore, it is possible to detect a user approaching the MFP without taking into account an offset included in an output signal SIG; therefore, even when an offset is included in an output signal SIG, the approach of a user to the MFP can be detected in a short time.

Subsequently, a process of detecting the approach of a user to the MFP when an output signal SIG includes an offset in a negative direction with respect to the reference voltage $V_r$ is explained with FIGS. 6A and 6B. FIGS. 6A and 6B are diagrams for explaining the process of detecting the approach of a user to the MFP according to the present embodiment. FIG. 6A is a diagram showing a signal level (voltage) of an output signal SIG including an offset, a first weighted average A of output signals SIG including the offset, and a second weighted average B of the output signals SIG including the offset. FIG. 6B is a diagram showing a value obtained by subtracting the second weighted average B from the first weighted average A (i.e., a difference between the first weighted average A and second weighted average B). In FIGS. 6A and 6B, the vertical axis indicates voltage, and the horizontal axis indicates time.

In a case where output signals SIG include an offset in the negative direction with respect to the reference voltage $V_r$, as shown in FIG. 6A, if whether a user has approached the MFP or not is detected by whether an output signal SIG or a first weighted average $A_m$ has exceeded the threshold 1 or not, neither an output signal SIG nor a first weighted average $A_m$ exceeds the threshold 1, so the approach of a user to the MFP may not be able to be detected.

Therefore, when a difference voltage D shown in FIG. 6B has exceeded the threshold 1', the sensor control unit 21b detects the approach of a user to the MFP. Accordingly, whether a user has approached the MFP or not can be detected by using a difference voltage D reduced in the influence of an offset included in output signals SIG; therefore, it is possible to detect the approach of a user to the MFP even when an offset in the negative direction with respect to the reference voltage $V_r$ is included in an output signal SIG. Furthermore, it is possible to detect a user approaching the MFP without taking into account an offset included in an output signal SIG; therefore, even when an offset is included in an output signal SIG, the approach of a user to the MFP can be detected in a short time.

In this way, the MFP according to the present embodiment can detect a user approaching the MFP without taking into account an offset included in an output signal SIG, and therefore can detect the approach of a user to the MFP in a short time even when an offset is included in an output signal SIG.

Incidentally, a program executed by the MFP according to the present embodiment is provided in such a manner that the program is built into a read-only memory (ROM) or the like in advance. Alternatively, the program executed by the MFP according to the present embodiment can be provided in such a manner that the program is recorded on a non-transitory computer-readable recording medium, such as a CD-ROM, a flexible disk (FD), a CD-R, or a digital versatile disk (DVD), in an installable or executable file format.

Furthermore, the program executed by the MFP according to the present embodiment can be provided in such a manner that the program is stored on a computer connected to a network such as the Internet so that the program can be downloaded via the network. Moreover, the program executed by the MFP according to the present embodiment can be provided or distributed via a network such as the Internet.

The program executed by the MFP according to the present embodiment is composed of modules including the above-described units (the system control unit 20, the engine control unit 23, and the sensor control unit 21b); a central processing unit (CPU) as actual hardware reads out the program from the ROM and executes the program, thereby the above-described units are loaded onto main storage, and the system control unit 20, the engine control unit 23, and the sensor control unit 21b are generated on the main storage.

Incidentally, in the above embodiment, there is described an example where the image forming apparatus according to the present invention is applied to an MFP having at least two functions out of a copy function, a printer function, a scanner function, and a facsimile function; however, the image forming apparatus according to the present invention can be applied to any image forming apparatus such as a copier, a printer, a scanner device, and a facsimile machine.

According to the exemplary embodiments of the present invention, it is possible to detect the approach of a user to a human-body detecting device in a short time even when an offset is included in a signal output from a sensor.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A human-body detecting device comprising:
   circuitry configured to:
   output signals according to a distance between the human-body detecting device and a user,
   weigh the signals with a first weight to generate a first weighted average of the signals,
   weigh the signals with a second weight to generate a second weighted average of the signals, the second weight being different from the first weight,
   calculate a difference between the first weighted average and the second weighted average, and
   detect, when the difference between the first weighted average and the second weighted average has exceeded a predetermined value, that the user is located within a predetermined range from the human-body detecting device.

2. The human-body detecting device according to claim 1, wherein the second weight average is greater than the first weight average.

3. The human-body detecting device according to claim 1, wherein the circuitry is further configured to detect ambient temperature of the human-body detecting device and invalidate a results of user detection using the signals when the ambient temperature detected by the circuitry has exceeded a predetermined temperature.

4. The human-body detecting device according to claim 1, wherein the circuitry is further configured to change the predetermined value according to an input signal.

5. An image forming apparatus comprising the human-body detecting device according to claim 1, wherein the circuitry is further configured to cause the image forming apparatus to return from an energy-saving mode when the human-body detecting device has detected that the user is located within the predetermined range from the image forming apparatus.

6. A human-body detecting method implemented by circuitry, the method comprising:
   generating signals according to a distance between a human-body detecting device and a user;
   weighing the signals with a first weight to generate a first weighted average of the signals;
   weighing the signals with a second weight to generate a second weighted average of the signals, the second weight being different from the first weight;
   calculating a difference between the first weighted average and the second weighted average; and
   detecting, when the difference between the first weighted average and the second weighted average has exceeded a predetermined value, that the user is located within a predetermined range from the human-body detecting device.

7. A computer program product comprising a non-transitory computer-readable recording medium having a computer program causing a computer to serve as a control circuit that executes:
   generating signals according to a distance between a human-body detecting device and a user;
   weighing the signals with a first weight to generate a first weighted average of the signals;
   weighing the signals with a second weight to generate a second weighted average of the signals, the second weight being different from the first weight;
   calculating a difference between the first weighted average and the second weighted average; and
   detecting, when the difference between the first weighted average and the second weighted average has exceeded a predetermined value, that the user is located within a predetermined range from the human-body detecting device.

8. The human-body detecting device according to claim 1, wherein the circuitry is further configured to generate the first weighted average by using a signal obtained from a sensor of the circuitry, and generate the second weighted average by using a signal that is obtained by the sensor at the same time when the signal used for generating the first weighted average is obtained.

* * * * *